United States Patent
Reitz et al.

(10) Patent No.: US 8,788,373 B2
(45) Date of Patent: Jul. 22, 2014

(54) CALL CENTER INTEGRATED PRINTING DEVICE CONSUMABLE CABINET DEVICE SERVICE

(75) Inventors: Jeremy Lee Reitz, Marion, NY (US);
Carl Robertson, Fairport, NY (US);
Neeraj Wadhera, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 523 days.

(21) Appl. No.: 12/891,894

(22) Filed: Sep. 28, 2010

(65) Prior Publication Data
US 2012/0078759 A1 Mar. 29, 2012

(51) Int. Cl.
*G06Q 10/00* (2012.01)
*G06Q 10/08* (2012.01)
*G03G 15/00* (2006.01)

(52) U.S. Cl.
CPC ............ *G06Q 10/087* (2013.01); *G03G 15/553* (2013.01); *G03G 15/5079* (2013.01)
USPC .................................. 705/28; 399/24; 347/7

(58) Field of Classification Search
CPC combination set(s) only.
See application file for complete search history.

(56) References Cited

U.S. PATENT DOCUMENTS

| | | | |
|---|---|---|---|
| 4,412,292 A | 10/1983 | Sedam et al. | |
| 4,961,507 A * | 10/1990 | Higgins | 221/129 |
| 6,182,857 B1 | 2/2001 | Hamm et al. | |
| 6,604,086 B1 | 8/2003 | Kolls | |
| 6,744,362 B2 * | 6/2004 | Carlson | 340/500 |
| 7,085,556 B2 | 8/2006 | Offer | |
| 7,124,097 B2 | 10/2006 | Claremont et al. | |
| 7,885,551 B2 * | 2/2011 | Matsuura et al. | 399/8 |
| 2004/0125403 A1 | 7/2004 | Furst et al. | |

\* cited by examiner

*Primary Examiner* — Luna Champagne
(74) *Attorney, Agent, or Firm* — Fay Sharpe LLP

(57) ABSTRACT

A system and method for tracking, controlling, and replenishing consumption of at least one consumable item in a printing system are disclosed. The system includes a first network and a printing device coupled to the first network. A cabinet device coupled to the first network stores and controllably dispenses the at least one consumable item.

21 Claims, 4 Drawing Sheets

CALL CENTER INTEGRATED PRINTING DEVICE CONSUMABLE CABINET DEVICE SERVICE

BACKGROUND

The embodiments described herein relate generally to a system and method for an accurate and reliable mechanism to track consumption of consumable supplies. The system finds particular application in printers, facsimile machines, scanning devices, multifunction devices, and the like, although it will be appreciated that selected aspects may find application in related areas encountering issues of tracking consumption of consumable supplies.

Currently, printers notify the operator when the printer runs out of a consumable, such as paper, toner, a fuser module, a fuser web, staples or any other consumable. The operator is also notified in cases such as when a disk is damaged and needs a possible replacement. Notifications such as these take place after an event has occurred. Moreover, when operating a fleet of printers (a network application services this fleet of printers), there is a need to restock consumables when their availability is near exhaustion. When this occurs, an individual typically will call a supply center and place an order, fill out and send, electronically or through a mail service, an order form to the supply center, or travel to the supply center to place the order for the needed consumables. The order for the consumables is then filled and returned by or to the individual for use in the device as needed.

It is known that mechanisms to track consumption of consumable items by customer environments using printers, facsimile machines, scanning devices, multifunction devices, and the like, have issues. Disadvantages of these current systems include customers running out of the consumable items as well as inaccurate billing for the items. This can be due to the inefficiencies surrounding a reactive replenishment system compared to a proactive replenishment system. There are also logistical inefficiencies around delivering consumable items in individual units rather than in bulk. Bulk packaging can result in less wasteful packaging of the consumable items for delivery as well as shipping cost savings. Furthermore, there can be undetected leakage or theft of consumable items within the customer environment.

Thus, it is desirable to establish a system and method for tracking, controlling, and replenishing consumption of consumable items in a printing device.

INCORPORATION BY REFERENCE

The following references, the disclosures of which are incorporated herein in their entireties by reference, are mentioned:

U.S. Patent Application Publication No. 2004/0125403, entitled METHOD AND APPARATUS FOR ENABLING DISTRIBUTED SUBSCRIPTION SERVICES, SUPPLIES MAINTENANCE, AND DEVICE-INDEPENDENT SERVICE IMPLEMENTATION, published on Jul. 1, 2004, to Furst, et al., discloses a distributed system that allows marking devices and the like to subscribe to and run device-centric services. A device model agent allows the devices to interact with service hosts of service providers to automate supplies maintenance, user help, and services subscription and deployment. The device model agent can be embedded in the devices, can be deployed in an add-on component connected to the device, or can be run by a separate machine as a proxy.

U.S. Pat. No. 7,124,097, entitled METHOD AND SYSTEM FOR ORDERING A CONSUMABLE FOR A DEVICE, published on Oct. 17, 2006, to Claremont, et al., discloses a method for ordering one or more consumables for a device that includes selecting one or more of the consumables used in the device to order using the device and submitting the order for the selected consumables using the device to one or more suppliers. A device for ordering one or more consumable for the device includes an ordering system in the device and a communication system in the device. The ordering system provides a menu of one or more of the consumables to select to place an order. The communication system submits the order for the selected consumables when completed.

BRIEF DESCRIPTION

In accordance with one aspect of the embodiments described herein, there is provided a system for tracking, controlling, and replenishing consumption of at least one consumable item in a printing device that includes a first network and a printing device coupled to the first network. A cabinet device coupled to the first network stores and controllably dispenses the at least one consumable item. A management device coupled to the first network receives a request to replenish a supply order for at least one consumable item and then sends an alert of the request. The system further includes a second network which is in communication with the first network. A services device coupled to the second network receives the alert of the request. The services device determines whether the request is valid using a supply cabinet model for asset association to the cabinet device, wherein a determination of a valid request initiates a replenishment of the consumable item to the printing device from the cabinet device.

In accordance with another aspect of the embodiments described herein, there is provided a method for tracking, controlling, and replenishing consumption of at least one consumable item in a printing device that includes a printing device coupled to a first network. A cabinet device coupled to the first network stores and controllably dispenses the at least one consumable item. A management device coupled to the first network receives a request to replenish a supply order for at least one consumable item and then sends an alert of the request. The system further includes a second network which is in communication with the first network. A services device coupled to the second network receives the alert of the request. The services device determines whether the request is valid using a supply cabinet model for asset association to the cabinet device, wherein a determination of a valid request initiates a replenishment of the consumable item to the printing device from the cabinet device.

In accordance with another aspect of the embodiments described herein, there is provided a system for tracking, controlling, and replenishing consumption of at least one consumable item in a printing device that includes a first network and a plurality of printing devices coupled to the first network. A vending machine coupled to the first network stores and controllably dispenses the at least one consumable item. A management device coupled to the first network receives a request to replenish at least one consumable item and sends an alert of the request. A second network provided by the system in communication with the first network. A services device coupled to the second network receives the alert of the request. The services device determines whether the request is valid using a supply cabinet model for asset association to the cabinet device. If the request is valid, the services device generates an authentication code.

DETAILED DESCRIPTION

Embodiments herein provide systems and method for tracking, controlling and replenishing consumption of at least one consumable item in a printing system. The system includes a cabinet device, i.e. a vending machine, which stores and dispenses consumable items for printing devices. It is integrated with a software platform to enable inventory tracking, proactive replenishment, and accurate billing based on consumption of the consumable item. The cabinet device is capable of dispensing the items based on requests originated from management devices, as well as walk-up requests within a customer environment. The software platform allows the user of the printing device to locate and identify a cabinet device for resupply when making a walk-up request. The cabinet device is capable of making automated requests for replenishment of the consumable items it dispenses.

Figure 1A:
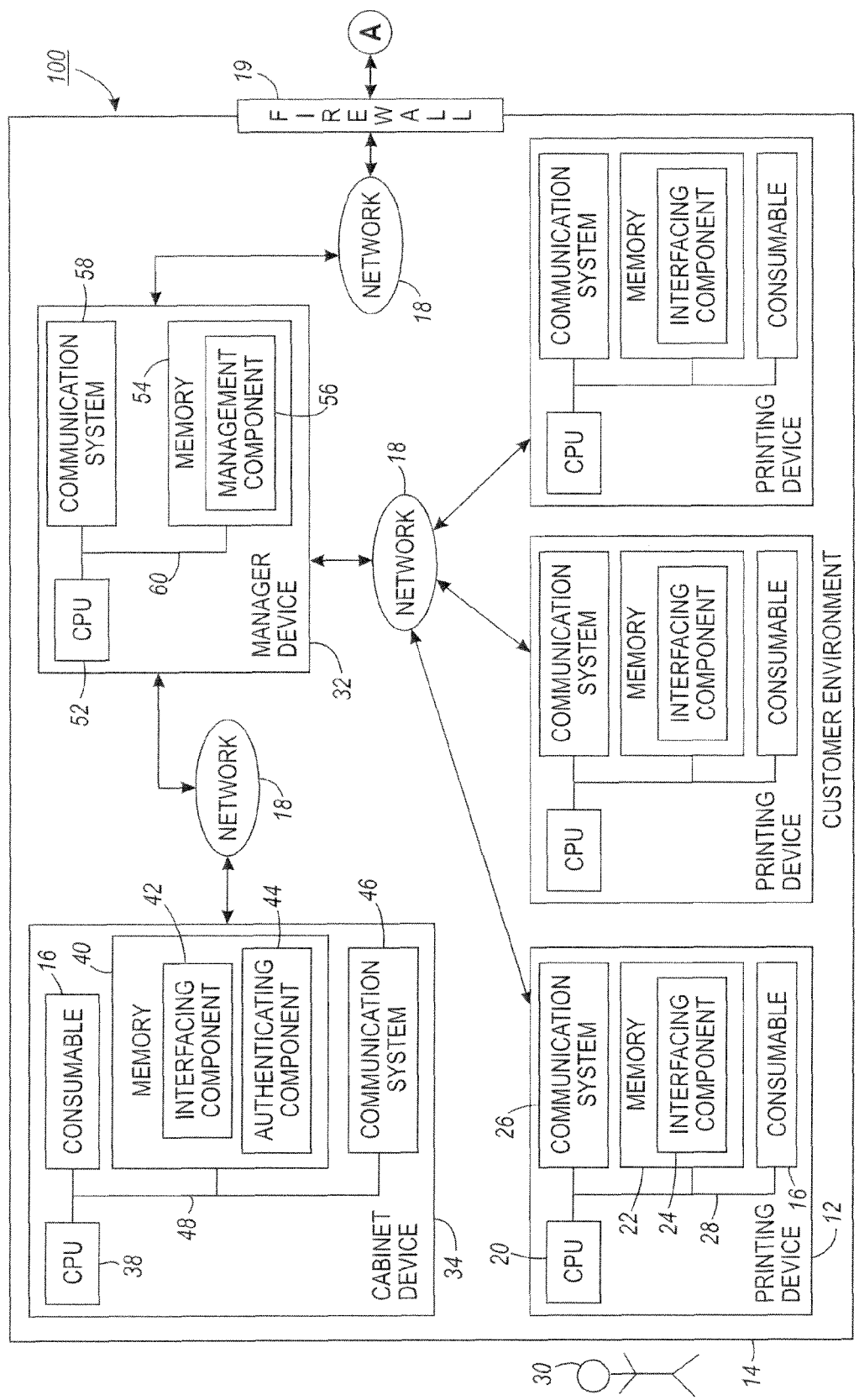
FIGS. 1A-1B are diagrammatic views of a call center integrated printing device consumable cabinet device service.
Figure 1B:
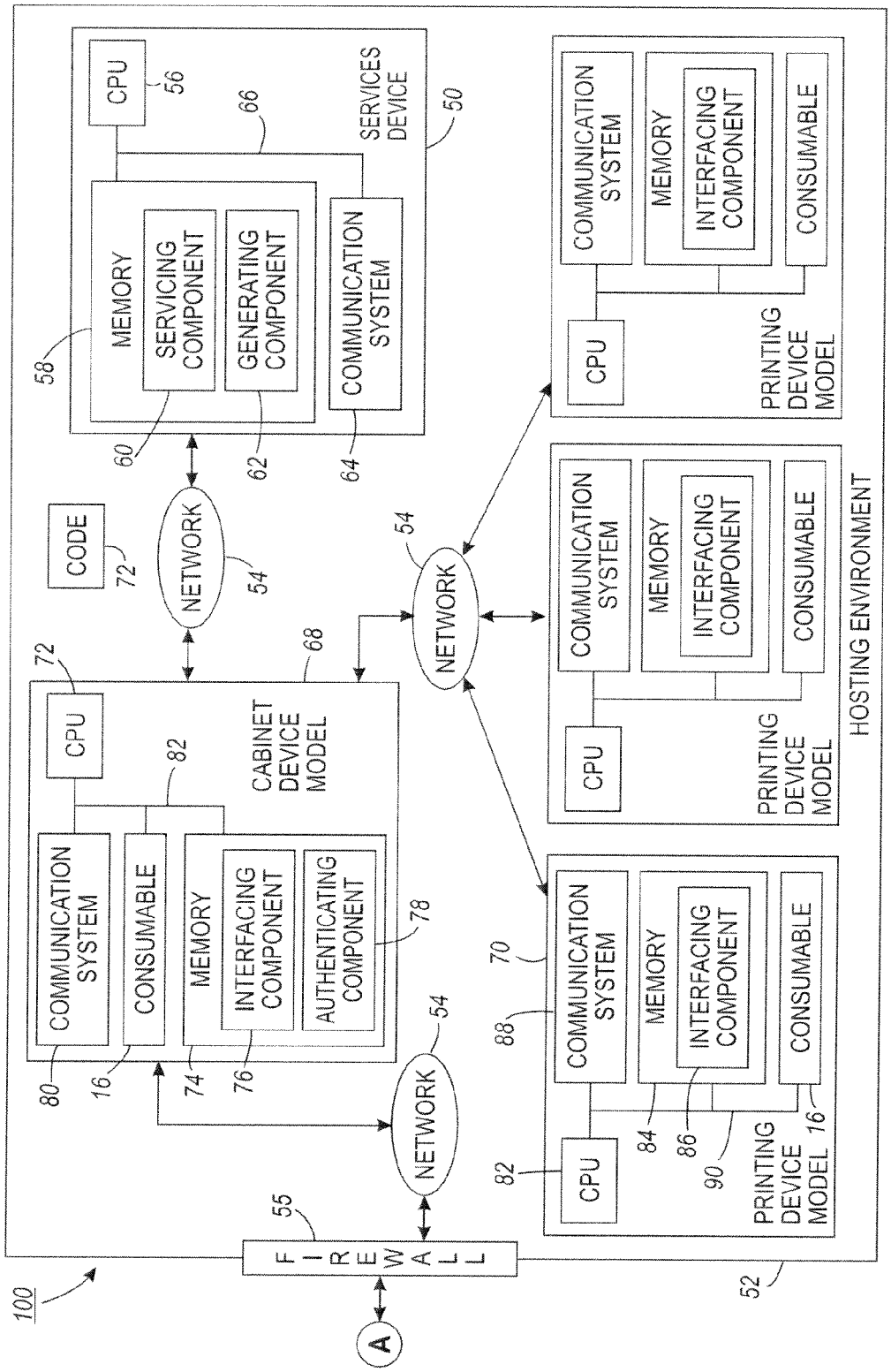

Referring to the drawings, FIG. 1 is a schematic depiction of a system 10 for tracking, controlling, and replenishing consumption of at least one consumable item in a printing device 12. The printing device 12 may be located within a customer environment 14 such as one requiring a fleet of printers, i.e. a plurality of printers. In this embodiment, the printing device 12 is a printer, although the printing device 12 could be a variety of different types of devices, apparatuses, or systems, such as a copy device, a facsimile device, a multifunctional device or combinations thereof.

The word "customer" herein is used to refer to a current or potential buyer or user of the products of an individual or organization, called the supplier, seller, or vendor. The word "hosted" herein is used to refer to a vendor or supplier who provides goods or services to a customer or company.

The printing device 12 includes at least one consumable item 16 such as paper, toner, ink, a fuser web, staples, or any other consumable item or a combination thereof. Although, it may be appreciated, the printing device 12 can have more than one consumable item, i.e. a plurality of consumable items.

The printing device 12 is coupled to a first network 18. The first network 18 may be a digital network such as a local area network (LAN), a wide area network (WAN), or a combination of networks. It may also be appreciated the first network 18 may include a network connection such as an Ethernet connection, for connecting the device to a data transmission network, an Internet or Internet Protocol (IP) network, VoiceOver IP, WiFi network, and other networks or systems, or a combination of networks and/or systems.

The network 18 may further include a firewall 19. The word "firewall" herein is used to refer to a part of a network designed to block unauthorized access while permitting authorized communications.

The printing device 12 includes a processor or central processing unit 20 (CPU), a memory 22, an interfacing component 24, and a communication system 26 which are coupled together by a bus system or other link 28, respectively, although the printing device 12 may comprise other components, other number of the components, and other combinations of the components.

The word "processor or central processing unit" herein is used for controlling the functionality of a device in a centralized manner. The digital processor can be variously embodied, such as by a single-core processor, a dual-core processor (or more generally by a multiple-core processor), a digital processor and cooperating math coprocessor, a digital controller, or the like.

The word "memory" herein is used for storing the programming suitable for carrying out device functions. The memory may represent any type of tangible computer readable medium such as random access memory (RAM), read only memory (ROM), magnetic disk or tape, optical disk, flash memory, or holographic memory. In one embodiment, the memory may include a combination of random access memory and read only memory. In some embodiments, the processor and memory may be combined in a single chip.

The words "communication system" herein is used by a device to operatively couple and communicate to other systems and devices. A variety of different types of communications networks, such as a hard wired communication network system, the Internet, an intranet, a LAN, or a WAN, and a variety of different types of communication protocols can be used for communication networks.

The interfacing component 24 provides an indication or alert of the status of the consumable item 16, such as whether the consumable 16 is due for replacement, running low, or has run out. The interfacing component 24 is in the form of software instructions stored in the memory 22 and which are executed by the processor 20 of the printing device 12. In one embodiment, the interfacing component is configured to allow a customer 30 to approach and enter a need for a supply order of at least one consumable item 16 at the printing device 12 and then send an alert to a manager device 32 of the need. In another embodiment, the interfacing component 24 is configured to receive an alert of a need for a supply order of at least one consumable item 16 directly from the printing device 12 and then send an alert to a manager device 32 of the need.

The system includes a cabinet device 34 which stores and controllably dispenses at least one consumable item 16 similar to that which is in the printing device 12. Although, it may be appreciated, the cabinet device 34 can have more than one consumable item, i.e. a plurality of consumable items.

The cabinet device 34 is coupled to the first network 18. The cabinet device 34 includes a processor or central processing unit 38, a memory 40, a interfacing component 42, an authenticating component 44, and a communication system 46 which are coupled together by a bus system or other link 48, respectively, although the cabinet device may comprise other components, other number of the components, and other combinations of the components.

The interfacing component 42 is in the form of software instructions stored in the memory 40 and which are executed by the processor 38 of the cabinet device 34. In one embodiment, the interfacing component 42 is configured to send an indication or alert of the status of the consumable item 16, such as whether the consumable 16 is due for replacement, running low, or has run out, to a manager device 32. In another embodiment, the interfacing component 42 is configured to alert a manager device 32 that the cabinet device 34 has been delivered and placed on the first network 18 within the customer environment 14.

The authenticating component 44 is in the form of software instructions stored in the memory 40 and which are executed by the processor 38 of the cabinet device 34. In one embodiment, the authenticating component 44 is configured to identify whether an authentication code generated and sent from a services device 50 is accepted by the cabinet device 34. In another embodiment, the authenticating component 44 is configured to accept the authentication code to authorize withdrawal of the at least one consumable item 16 from the cabinet device 34.

The manager device 32 is coupled to the first network 18. The manager device 32 includes a processor or central processing unit 52 (CPU), a memory 54, a managing component 56, and a communication system 58 which are coupled together by a bus system or other link 60, respectively, although the manager device 32 may comprise other components, other number of the components, and other combinations of the components.

The managing component 56 is in the form of software instructions stored in the memory 54 and which are executed by the processor 52 of the manager device 32. In one embodiment, the managing component 56 is configured to discover the cabinet device 34. In another embodiment, the managing component 56 is configured to receive an alert of a request to replenish a supply order for at least one consumable item 16. In yet another embodiment, the managing component 56 is configured to send an alert of the request to replenish the supply order for at least one consumable item 16 to a services device 50.

The system further includes a hosted environment 52 which includes the services device 50 coupled to a second network 54. The second network 54 is in communication with the first network 18. It may be appreciated, the second network 54 may include similar network connections as the first network 18. The second network 54 may further include a firewall 55.

The services device 50 is similar to a help desk support center or a call center. Corporations typically provide help desk support to their customers via a toll-free phone number, website and/or electronic mail. So the help desk is able to be located in any location and may even allow for working from a home instead of a traditional location. In this embodiment, the services device 50 creates various virtual help desk models which replicate or mirrors the customer environment 14.

The servicer device 50 includes a processor or central processing unit 56 (CPU), a memory 58, a servicing component 60, a generating component 62, and a communication system 64 which are coupled together by a bus system or other link 66, respectively, although the servicer device 50 may comprise other components, other number of the components, and other combinations of the components.

The servicing component 60 is in the form of software instructions stored in the memory 58 and which are executed by the processor 56 of the services device 50. In one embodiment, the servicing component 60 is configured to create a supply cabinet device model 68 and a printing device model 70. In another embodiment, the servicing component 60 is configured to receive an alert of a request to replenish a supply order for at least one consumable item 16 from the managing component 56. In yet another embodiment, the servicing component 60 is configured to determine whether the request to replenish a supply order for at least one consumable item 16 is valid using the supply cabinet model 68 for asset association to the cabinet device 34. In still another embodiment, the servicing component 60 is configured once determining the request is valid to initiate a replenishment of the consumable item to the printing device 12 from the cabinet device 34.

In still yet another embodiment, the servicing component defines a minimum and maximum quantity of the consumable item for the asset model.

The generating component 62 is in the form of software instructions stored in the memory 58 and which are executed by the processor 56 of the cabinet device model 50. The generating component 62 is configured to generate an authentication code 72. The authentication code is a short piece of information used to authenticate, if accepted by the cabinet device 34, withdrawal of the at least one consumable item 16 for the printing device 12. The authentication code may be generated using an authentication algorithm. The authentication code may be, for example, any combination of digits, for example, at least six or eight digits. The algorithm may use pre-loaded authentication information, e.g., a set of a large number, e.g., at least one hundred eight character authentication codes. These set of codes are stored in memory and are identifiable by a cabinet device with authenticating capability such as, other same family cabinet devices.

In one embodiment, the generating component 62 is configured to generate the authentication code 72 to send to the customer 30. In another embodiment, the generating component 62 is configured to determine an expiration time for the authentication code 72 in order to make available consumable items for other requests.

The cabinet device model 68 virtually stores and controllably dispenses at least one consumable item 16 similar to that which is in the printing device model 70. The printing device model 70 is a replica of the printing device 12. Although, it may be appreciated, the cabinet device model 68 can have more than one consumable item, i.e. a plurality of consumable items.

The cabinet device model 68 is virtually coupled to the second network 54. The cabinet device model 68 virtually includes a processor or central processing unit 72, a memory 74, a interfacing component 76, an authenticating component 78, and a communication system 80 which are coupled together by a bus system or other link 82, respectively, although the cabinet device model may comprise other components, other number of the components, and other combinations of the components. It may be appreciated, the cabinet device model 68 is similarly configured to the cabinet device 34 located in the customer environment 14.

The printing device model 70 is virtually coupled to the second network 54. The printing device model 70 includes a processor or central processing unit 82 (CPU), a memory 84, an interfacing component 86, and a communication system 88 which are coupled together by a bus system or other link 90, respectively, although the printing device model 70 may comprise other components, other number of the components, and other combinations of the components. It may be appreciated, the printing device model 70 is similarly configured to the printing device 12 located in the customer environment 14.

The printing device model 70 further includes being filled similarly with at least one consumable item 16 as the printing device 12 within the customer environment 14.

Figure 2:
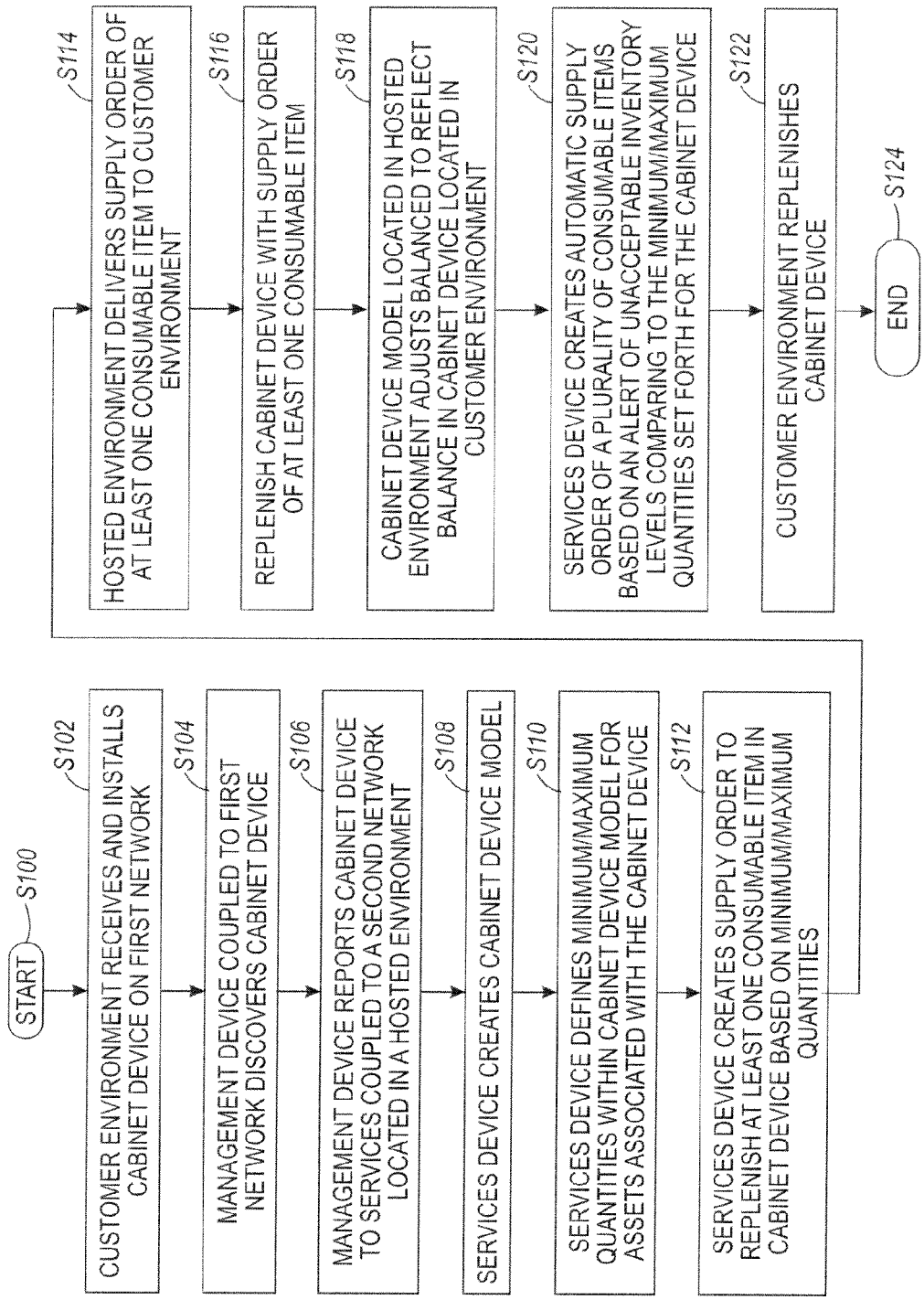
FIG. 2 is a flowchart illustrating a method of supplies vending device automated inventory management in accordance with an embodiment.

FIG. 2 is a flowchart illustrating a method of supplies vending device automated inventory management, i.e. cabinet device startup and replenishment in a system such as that shown in FIG. 1. The method begins at S100. At S102, a cabinet device is received and installed in a customer environment on a first network. The cabinet device is a vending machine.

At S104, the cabinet device is discovered by a management device. The management device is coupled to the first network.

At S106, the cabinet device is reported by the management device to a services device. The services device is coupled to second network located in a hosted environment. The first and second networks are in communication with each other.

At S108, a cabinet device model is created by the services device.

At S110, minimum/maximum quantities for assets, e.g., inventory items or consumable items, associated with the cabinet device are defined by the services device. Consumable items available for configuration in the cabinet device may be restricted to those consumable items valid for the cabinet device model which is associated with the cabinet device model.

At S112, a supply order, based on the minimum/maximum quantities, is created by the services device to replenish at least one consumable item in the cabinet device.

At S114, the supply order of at least one consumable item is delivered by the hosted environment to the customer environment.

At S116, the cabinet device is replenished with the supply order of at least one consumable item.

At S118, the balance in the supply cabinet model located in the hosted environment is adjusted to reflect the balance in the cabinet device located in the customer environment. This adjustment of balance may support guaranteed accurate inventory balances.

At S120, an automatic supply order of a plurality of consumable items, i.e. a bulk order, is created for unacceptable inventory levels which are based on the minimum/maximum quantities created for the cabinet device. Bulk orders, in comparison to orders for individual consumable items, may reduce the shipping costs for the customer environment from the hosted environment.

At S122, the cabinet device is replenished by the customer environment with the bulk order.

The method ends at S124.

Figure 3:
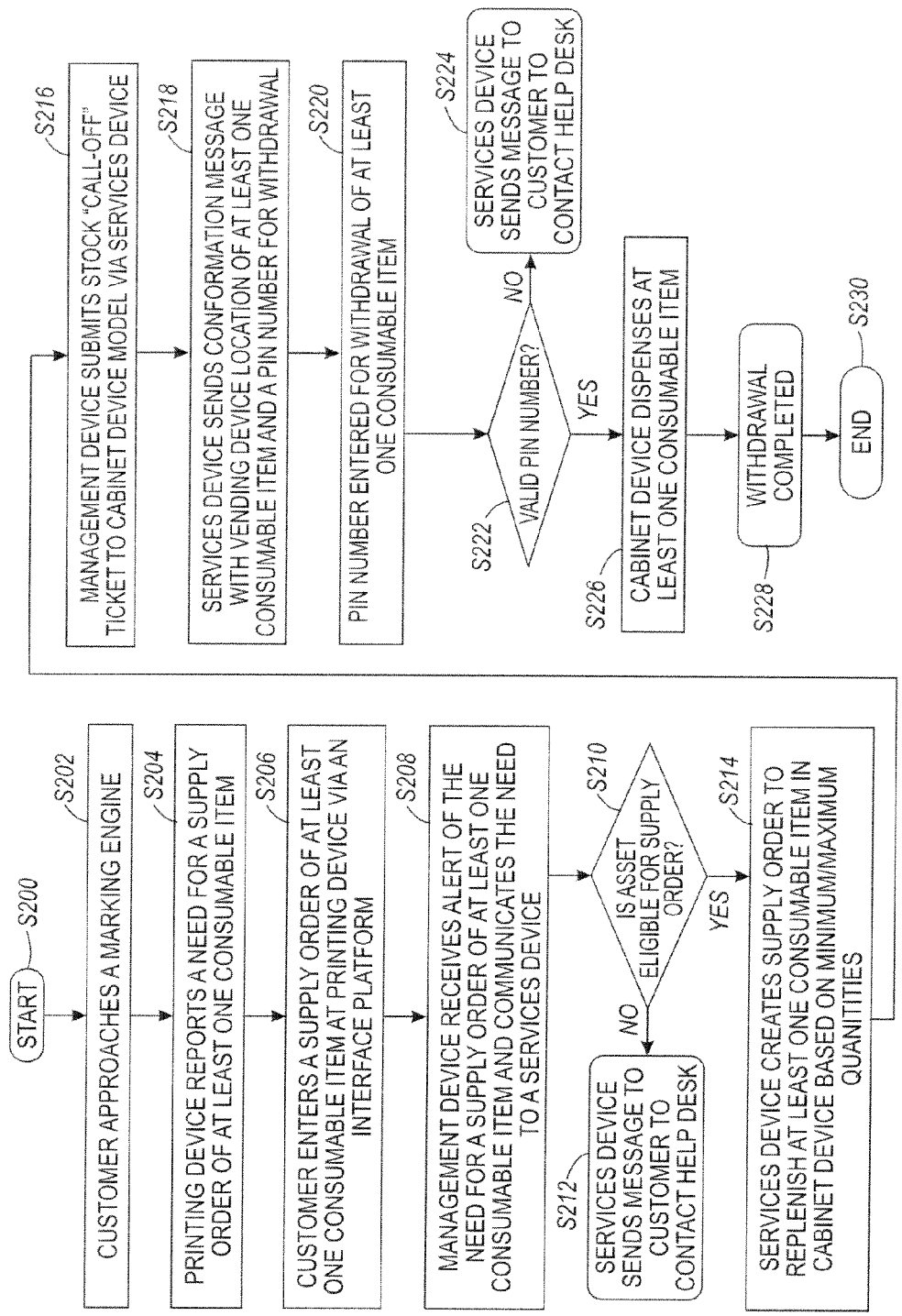
FIG. 3 is a flowchart illustrating a method of a removal of consumable items from a cabinet device in a system in accordance with another embodiment.

FIG. 3 is a flowchart illustrating a method of a removal of consumable items from a cabinet device in a system such as that shown in FIG. 1. The method begins at S200. At S202, a printing device is approached by a customer.

At S204, a need for a supply order of at least one consumable item is reported by the printing device.

At S206, the need for a supply order of at least one consumable item is entered by the customer at the printing device via an interface application. The interface application is in the form of software instructions stored in memory and are executed by a processor of the printing device.

At S208, an alert is received by the management device of the need for the supply order of at least one consumable item and is then communicated by the management device to a services device.

At S210, if the asset or consumable item is eligible for the supply order at S208, the method proceeds to S214, otherwise, to S212.

At S214, whether the supply order of at least one consumable item is available in the cabinet device to replenish the printing device is determined by the services device.

At S216, a stock "call-off" ticket is submitted to the cabinet device model by the management device via the services device. A "call-off" ticket is a signal to reduce the stock in the cabinet device model.

At S218, a confirmation message is sent by the services device. The message contains the location of the at least one consumable item in the cabinet machine and a pin number for withdrawal. The pin number may expire after a predetermined time in order to allow for other requests.

At S220, a pin number is entered for withdrawal of at least one consumable item.

At S222, if the pin number is valid, the method proceeds to S226, otherwise, to S224.

At S226, the at least one consumable item is dispensed by the cabinet device.

At S228, the withdrawal of the at least one consumable item is completed.

The method ends at S230.

The exemplary system and method for tracking, controlling, and replenishing consumption of at least one consumable item has several advantages. First, it allows for accurate billing for consumption of consumable items. Second, a proactive approach to replenishment of supplies may ensure that customers do not run out the consumable item. Third, there may be accurate inventory tracking and detection of leakage or prevention of theft within the customer environment. Fourth, software integration enables enhanced workflows for inventory control, e.g., contractual limits, automated requests for approval, etc. Fifth, there may be logical efficiencies around delivering supplies in bulk rather than in individual units. Sixth, there may be less wasteful packaging of consumable items for delivery by a vending device rather than in individual packages.

The exemplary system and method for tracking, controlling, and replenishing consumption of at least one consumable item is particularly suited to use within an organization, such as a company or government department, which operates at different locations, nationally or internationally and requires a plurality of marking devices.

The method illustrated in FIGS. 1-3 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It will be appreciated that variants of the above-disclosed and other features and functions, or alternatives thereof, may be combined into many other different systems or applications. Various presently unforeseen or unanticipated alternatives, modifications, variations, or improvements there in may be subsequently made by those skilled in the art which are also intended to encompassed by the following claims.

What is claimed is:

1. A system for tracking, controlling, and replenishing consumption of at least one consumable item in a printing system comprising:
   a first network;
   a printing device coupled to the first network and consuming the at least one consumable item;
   a cabinet device coupled to the first network that stores and controllably dispenses the at least one consumable item;
   a management device coupled to the first network that receives a request to replenish a supply order for the at least one consumable item;
   a second network, the second network in communication with the first network; and
   a services device coupled to the second network, the services device being adapted to define an inventory of the cabinet device by creating a supply cabinet model being similarly configured to the cabinet device, the cabinet device model being adapted to virtually store at least one consumable item, the services device being further adapted to:
      in response to receiving an alert of the request from the management device, determine whether the request is valid using the supply cabinet model for asset association to the cabinet device, and,
      in response to determining a valid request, initiate a replenishment of the consumable item to the printing device from the cabinet device by adjusting a balance in the supply cabinet model and sending a message to a user indicating a location of the cabinet device dispensing the consumable item.

2. The system of claim 1, wherein the cabinet device is a vending machine.

3. The system of claim 2, wherein the management device receives the request to replenish the supply order for at least one consumable item from the at least one printing system, the vending machine, or a combination thereof.

4. The system of claim 1, further comprising a plurality of printing devices.

5. The system of claim 1, wherein the management device receives a request to replenish a supply order for a plurality of consumable items.

6. The system of claim 1, wherein the management device comprises a managing component in the form of software instructions stored in memory and which are executed by a processor of the management device.

7. The system of claim 1, wherein the services device comprises a servicing component in the form of software instructions stored in memory and which are executed by a processor of the services device.

8. The system of claim 1, wherein the services device defines a minimum and maximum quantity of the consumable item for the asset model.

9. The system of claim 1, wherein the first network and the second network is selected from the group consisting of a local area network (LAN), a wide area network (WAN), a fax over internet protocol (FoIP) network, a PSTN, a WiFi network, and a combination thereof.

10. The system of claim 1, wherein the consumable item is selected from the group consisting of paper, toner, a fuser module, a fuser web, staples, other consumables, and combinations thereof.

11. The system of claim 1, wherein the consumable item is toner.

12. A method for tracking, controlling, and replenishing consumption of at least one consumable item in a printing system comprising:
   providing a printing device coupled to a first network, the printing device consuming the at least one consumable item;
   providing a cabinet device coupled to the first network for storing and controllably dispensing the consumable item;
   providing a management device coupled to the first network for receiving a request to replenish the at least one consumable item, and sending an alert of the request; and
   providing a services device coupled to a second network wherein the second network is in communication with the first network,
   defining by the services device an inventory of the cabinet device by creating a supply cabinet model being similarly configured to the cabinet device and virtually storing at least one consumable item in the supply cabinet model;
   receiving at the services device the alert of the request;
   determining at the services device whether a supply order of the consumable item is available in the cabinet device; and,
   in response to determining that the supply order is available, adjusting a balance in the supply cabinet model and sending a message to a user indicating a location of the cabinet device dispensing the consumable item.

13. The method of claim 12, wherein the cabinet device is a vending machine.

14. The method of claim 13, wherein the management device receives the request to replenish at least one consumable item from at least one printing system, the vending machine, or a combination thereof.

15. The method of claim 12, further comprising a plurality of printing devices.

16. The method of claim 12, wherein the management device receives a request to replenish a supply order for a plurality of consumable items.

17. The method of claim 12, wherein the services device defines a minimum and maximum quantity of the consumable item for the asset model.

18. A system for tracking, controlling, and replenishing consumption of at least one consumable item in a printing system comprising:
   a first network;
   a plurality of printing devices coupled to the first network, each printing device consuming the at least one consumable item;
   a vending machine coupled to the first network that stores and controllably dispenses the at least one consumable item;
   a management device coupled to the first network that receives a request to replenish the at least one consumable item at a printing device;
   a second network, the second network in communication with the first network; and a services device coupled to the second network, the services device being adapted to define an inventory of the cabinet device by creating a supply cabinet model being similarly configured to the cabinet device, the cabinet device model being adapted to virtually store at least one consumable item, the services device being further adapted to:

in response to receiving an alert of the request from the management device, initiate a replenishment of the consumable item to the printing device from the vending machine by adjusting a balance in the supply cabinet model and sending a message to a user indicating a location of the cabinet device dispensing the consumable item.

19. The system of claim 18, wherein the vending machine further comprises an authentication component configured to:

acquire the authentication code sent from the services device;

determine whether the acquired authentication code is accepted; and in response to determining that the authentication code is accepted, withdraw at least one consumable item from the vending machine for the printing device.

20. The system of claim 18, wherein the services device comprises a generating component in the form of software instructions stored in memory and which are executed by a processor of the services device.

21. The system of claim 18, wherein the vending machine comprises an authenticating component in the form of software instructions stored in memory and which are executed by a processor of the services device.

* * * * *